(12) United States Patent
Yoon

(10) Patent No.: US 11,777,753 B2
(45) Date of Patent: Oct. 3, 2023

(54) APPARATUS AND METHOD FOR MANAGING ONLINE CONFERENCE

(71) Applicant: SAMSUNG SDS CO., LTD., Seoul (KR)

(72) Inventor: Hee Tae Yoon, Seoul (KR)

(73) Assignee: SAMSUNG SDS CO., LTD., Seoul (KR)

(*) Notice: Subject to any disclaimer, the term of this patent is extended or adjusted under 35 U.S.C. 154(b) by 0 days.

(21) Appl. No.: 17/007,091

(22) Filed: Aug. 31, 2020

(65) Prior Publication Data

US 2021/0067360 A1    Mar. 4, 2021

(30) Foreign Application Priority Data

Aug. 29, 2019  (KR) .......................... 10-2019-0106682

(51) Int. Cl.
  *G06F 15/16*  (2006.01)
  *H04L 12/18*  (2006.01)
  *G06Q 10/02*  (2012.01)

(52) U.S. Cl.
  CPC ......... *H04L 12/1818* (2013.01); *G06Q 10/02* (2013.01)

(58) Field of Classification Search
  CPC ............ H04L 12/1818; H04L 12/1822; H04L 12/185; G06Q 10/02
  See application file for complete search history.

(56) References Cited

U.S. PATENT DOCUMENTS

| | | | | |
|---|---|---|---|---|
| 8,346,589 | B1* | 1/2013 | Norton | G06Q 10/109 705/7.18 |
| 2004/0199580 | A1* | 10/2004 | Zhakov | H04M 3/565 709/204 |
| 2011/0271129 | A1* | 11/2011 | Flannagan | H04L 65/4015 709/204 |
| 2016/0307165 | A1* | 10/2016 | Grødum | G07C 9/21 |
| 2018/0012192 | A1* | 1/2018 | Rosenberg | H04L 65/403 |
| 2018/0103074 | A1* | 4/2018 | Rosenberg | H04L 65/1069 |
| 2018/0165656 | A1* | 6/2018 | Tessler | G06Q 10/1095 |
| 2019/0013955 | A1 | 1/2019 | Yoo | |
| 2019/0281092 | A1* | 9/2019 | Yamada | H04L 65/403 |
| 2020/0019709 | A1* | 1/2020 | Callaghan | G06F 9/4401 |
| 2020/0258051 | A1* | 8/2020 | Ma | G06Q 10/1095 |
| 2020/0344278 | A1* | 10/2020 | Mackell | H04N 7/147 |

* cited by examiner

*Primary Examiner* — John B Walsh
(74) *Attorney, Agent, or Firm* — The PL Law Group, PLLC

(57) ABSTRACT

An apparatus for managing an online conference according to one embodiment includes a group identification information receiver configured to receive group identification information regarding an offline conference room from a user terminal of a user who intends to attend an online conference in the offline conference room, an online conference identifier configured to identify an online conference connected to the offline conference room based on the received group identification information, and an online conference manager configured to transmit online conference entry information for attending the identified online conference to the user terminal.

12 Claims, 7 Drawing Sheets

US 11,777,753 B2

APPARATUS AND METHOD FOR MANAGING ONLINE CONFERENCE

CROSS REFERENCE TO RELATED APPLICATIONS AND CLAIM OF PRIORITY

This application claims the benefit of Korean Patent Application No. 10-2019-0106682 filed on Aug. 29, 2019 in the Korean Intellectual Property Office, the disclosure of which is incorporated herein by reference in its entirety.

1. TECHNICAL FIELD

The disclosed embodiments relate to technology for managing an online conference.

2. BACKGROUND ART

Conventionally, in order to book an online conference, such as a web conference, general users who use an online conference service and video conference equipment installed in an offline conference room are invited as participants of the online conference.

In this case, the conventional method requires a separate reservation for an offline conference room with video conference equipment installed. Also, in the conventional method, in the case where a user who attends an online conference in an offline conference room cannot be accurately identified at the time of online conference reservation, a conference manager directly invites the user in the offline conference room to the online conference while conducting the online conference, or conducts the online conference with no restrictions on conditions of attendance.

Accordingly, the conventional method may have a security issue because anyone who does not conduct an online conference can freely attend the corresponding online conference as long as he/she acquires information for attending the online conference.

SUMMARY

The disclosed embodiments are intended to provide an apparatus and method for managing an online conference.

According to one embodiment, an apparatus for managing an online conference includes a group identification information receiver configured to receive group identification information regarding an offline conference room from a user terminal of a user who intends to attend an online conference in the offline conference room, an online conference identifier configured to identify an online conference connected to the offline conference room based on the received group identification information, and an online conference manager configured to transmit online conference entry information for attending the identified online conference to the user terminal.

The user terminal may include at least one of a personal terminal of the user and a public terminal included in the offline conference room.

When the user terminal is the public terminal, the identification information receiver may receive the group identification information stored in the public terminal from the public terminal.

The online conference entry information may include at least one of identification information regarding the online conference and an access address for attending the online conference.

When the online conference connected to the offline conference room does not exist, the online conference manager may create a new online conference connected to the offline conference room and transmit online conference entry information for attending the new online conference to the user terminal.

The online conference manager may manage participant information that includes at least one of a type of participant, participant identification information and group identification information for each of one or more participants attending the online conference.

According to another embodiment, a method of managing an online conference includes receiving group identification information regarding an offline conference room from a user terminal of a user who intends to attend an online conference in the offline conference room, identifying an online conference connected to the offline conference room based on the received group identification information, and transmitting online conference entry information for attending the identified online conference to the user terminal.

The user terminal may include at least one of a personal terminal of the user and a public terminal included in the offline conference room.

The receiving may include, when the user terminal is the public terminal, receiving the group identification information stored in the public terminal from the public terminal.

The online conference entry information may include at least one of identification information regarding the online conference and an access address for attending the online conference.

The method may further include, after the identifying, when the online conference connected to the offline conference room does not exist, creating a new online conference connected to the offline conference room and transmitting online conference entry information for attending the new online conference to the user terminal.

The method may further include managing participant information that includes at least one of a type of participant, participant identification information and group identification information for each of one or more participants attending the online conference.

DETAILED DESCRIPTION

Figure 1:
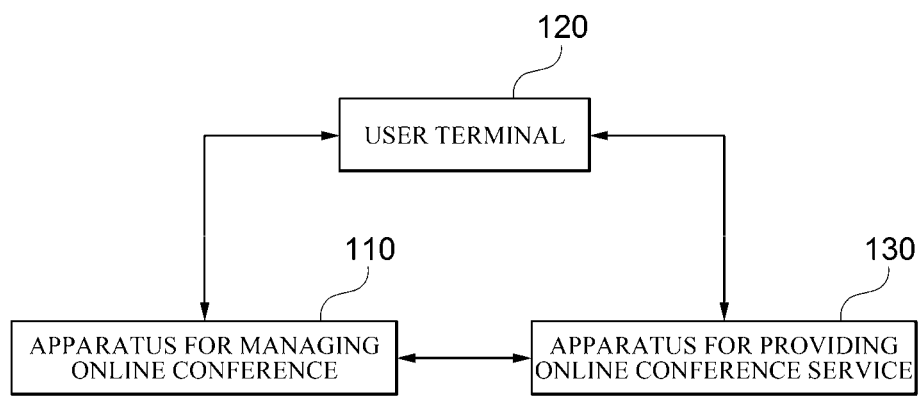
FIG. 1 is a block diagram illustrating a configuration of an online conference system according to an embodiment.

Details of exemplary embodiments are provided in the following detailed description with reference to the accompanying drawings. The disclosure may be understood more readily by reference to the following detailed description of exemplary embodiments and the accompanying drawings. The disclosure may, however, be embodied in many different forms and should not be construed as being limited to the embodiments set forth herein. Rather, these embodiments are provided so that the disclosure will be thorough and complete and will fully convey the concept of the invention to those skilled in the art, and the disclosure will only be defined by the appended claims. Like reference numerals refer to like elements throughout the specification.

It will be understood that, although the terms first, second, etc. may be used herein to describe various elements, these elements should not be limited by these terms. These terms are only used to distinguish one element from another. Also, the singular forms are intended to include the plural forms as well, unless the context clearly indicates otherwise. In the specification, unless explicitly described to the contrary, the word "comprise" and variations such as "comprises" or "comprising," will be understood to imply the inclusion of stated elements but not the exclusion of any other elements. Terms such as "unit" and "module" denote units that process at least one function or operation, and they may be implemented by using hardware, software, or a combination of hardware and software.

FIG. 1 is a block diagram illustrating a configuration of an online conference system 100 according to an embodiment.

Referring to FIG. 1, the online conference system 100 includes an apparatus 110 for managing an online conference, a user terminal 120, and an apparatus 130 for providing an online conference service.

The apparatus 110 for managing an online conference is an apparatus for simultaneously, efficiently managing participants who attend an online conference in an offline conference room or and places other than the offline conference room by using an online conference technique, such as a web conference. Here, the offline conference room may be a conference place with video conference equipment installed.

In one embodiment, the apparatus 110 for managing an online conference may determine whether a user who has requested to attend the online conference is legitimate to attend, and may provide information for attending the online conference to the user. Also, the apparatus 110 for managing an online conference may manage participant information of participants who attend the online conference.

The user terminal 120 may be a device for receiving an online conference service from the apparatus 130 for providing an online conference service. The user terminal 120 may include various types of devices, such as a desktop computer, a tablet computer, a laptop computer, a smartphone, and the like, but is not necessarily limited thereto, and may include other various types of devices provided with a display means, an input/output means, an information processing means, and communication means using a wired and/or wireless network.

The apparatus 130 for providing an online conference service may be configured with one or more servers for providing an online conference service, in association with the user terminal 120, to the participant who attends the online conference. The apparatus 130 for providing an online conference service may store and manage various types of information for operating the online conference service.

Figure 2:
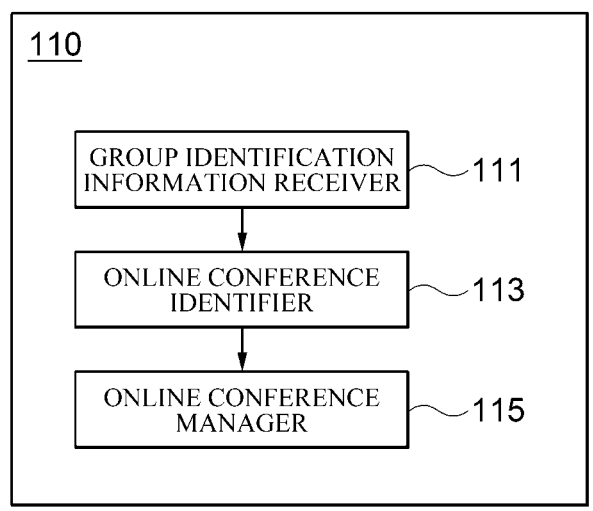
FIG. 2 is a block diagram illustrating a configuration of an apparatus for managing an online conference according to an embodiment.

FIG. 2 is a block diagram illustrating a configuration of an apparatus 110 for managing an online conference according to an embodiment.

Referring to FIG. 2, the apparatus 110 for managing an online conference includes a group identification information receiver 111, an online conference identifier 113, and an online conference manager 115.

The group identification information receiver 111 receives group identification information regarding an offline conference room from the user terminal 120 of a user who intends to attend an online conference in the offline conference room.

In this case, the group identification information may be information assigned to the offline conference room to identify a participant attending the online conference in the offline conference room.

In one embodiment, the user terminal 120 may include at least one of a personal terminal of the user and a public terminal included in the offline conference room.

When the user terminal 120 is a personal terminal, the group identification information receiver 111 may receive the group identification information from the personal terminal.

In this case, the personal terminal may acquire the group identification information regarding the offline conference room from, for example, a near field communication (NFC) tag, a QR code, or the like which is placed in the offline conference room. However, the method of acquiring the group identification information is not necessarily limited to the above examples. For example, various methods may be used, such as a method of acquiring identification information related to a short-range wireless network (e.g., Wi-Fi, ZigBee, or the like) provided in the offline conference room as group identification information, a method of acquiring group identification information regarding the offline conference room from a specific device arranged in the offline conference room by utilizing Bluetooth, a method of acquiring sound at inaudible frequencies output through a speaker installed in the offline conference room as group identification information regarding the offline conference room, and the like.

Meanwhile, the personal terminal may transmit an online conference participation request message including the acquired group identification information and user identification information regarding the user stored in the personal terminal to the apparatus 110 for managing an online conference. In this case, the user may use the online conference service through the personal terminal based on the user identification information.

Also, in a case where the user terminal 120 is a public terminal, the group identification information receiver 111 may receive group identification information stored in the public terminal from the public terminal.

In this case, the public terminal may be a terminal installed in the offline conference room. In one embodiment, the public terminal may store public terminal identification information, such as a public account, and the group identification information regarding the offline conference room.

For example, the user may be provided with the online conference service through an online conference application installed in the public terminal. In this case, the online conference application may be a program for allowing the user to provide an online conference access service in association with the apparatus 110 for managing an online conference. In addition, the online conference application may be a program for providing an online conference service to the user in association with the apparatus 130 for providing an online conference service.

Hence, when the user executes the online conference application by using the public terminal identification information stored in the public terminal, the public terminal may transmit the online conference participation request message that contains the group identification information and public terminal identification information, which are stored in the public terminal, to the apparatus 110 for managing an online conference. In this case, the user may use the online conference service based on the public terminal identification information stored in the public terminal.

In addition, in one embodiment, the user may execute the online conference application using a single sign on (SSO) system provided by the public terminal. For example, the user may execute the online conference application installed in the public terminal by using the user identification information based on the SSO system. At this time, the public terminal may transmit the online conference participation request message that contains the group identification information stored in the public terminal and the user identification information acquired through the SSO system to the apparatus 110 for managing an online conference. In this case, the user may use the online conference service through the public terminal based on the user identification information.

The online conference identifier 113 identifies the online conference connected to the offline conference room based on the group identification information received from the user terminal 120.

For example, the online conference identifier 113 may determine whether there is an online conference connected to the received group identification information among one or more ongoing online conferences. When there is an online conference connected to the received group identification information, the online conference identifier 113 may invite the user to the identified online conference. In contrast, when an online conference connected to the received group identification information does not exist, the online conference identifier 113 may perform an operation for creating a new online conference.

The online conference manager 115 transmits online conference entry information for attending the identified online conference to the user terminal 120.

In this case, the online conference entry information may be information required for the user terminal 120 to enter the online conference. In one embodiment, the online conference entry information may include identification information regarding the online conference and an access address for attending the online conference.

In one embodiment, when an online conference connected to the offline conference room does not exist, the online conference manager 115 may create a new online conference connected to the offline conference room.

For example, when the online conference identifier 113 determines that an online conference connected to the group identification information received from the user terminal 120 does not exist, the online conference manager 115 may create a new online conference by setting the user and the offline conference room as participants. In this case, the online conference manager 115 may generate and manage various types of information related to the created new online conference, such as identification information of the new online conference, an access address for attending the new online conference, information on participants attending the new online conference, and the like.

Thereafter, the online conference manager 115 may transmit online conference entry information for attending the new online conference to the user terminal 120.

In addition, in one embodiment, the online conference manager 115 may manage participant information including at least one of the type of participant, participant identification information and group identification information for each of one or more participants who attend the online conference.

In this case, the participant type may be information for distinguishing between the participants who attend the online conference in the offline conference room and a place other than the offline conference room.

The participant identification information may be information for uniquely identifying each of one or more participants. For example, participant identification information regarding a participant who attends the online conference in a place other than the offline conference room may include various types of information, such as an email address, a phone number, an employee number, and the like, and may include a number, a code, or the like, which is mapped to such identification information.

In addition, the participant information regarding the offline conference room may further include information for accessing video conference equipment installed in the offline conference room, for example, an IP address and a phone number of the video conference equipment.

In one embodiment, the participant information may include all of the participant type, the participant identification information, and the group identification information. In this case, the online conference manager 115 may determine whether each participant attends the online conference in the offline conference room or in a place other than the offline conference room based on the type of each participant.

In another embodiment, the participant information may include at least one of the participant identification information and the group identification information. In this case, the online conference manager 115 may distinguish the type of participant depending on whether the participant information includes the group identification information or not. For example, when participant information of a specific participant includes only participant identification information, the online conference manager 115 may determine that the participant type of the corresponding participant is a participant attending the online conference in a place other than an offline conference room. In another example, when participant information of a specific participant includes both participant identification information and group identification information, the online conference manager 115 may determine that the participant type of the corresponding participant is a participant attending the online conference in an offline conference room.

Meanwhile, regarding the participant information, the above-described examples are only an embodiment, and the participant information may be variously configured according to the user's setting.

Figure 3:
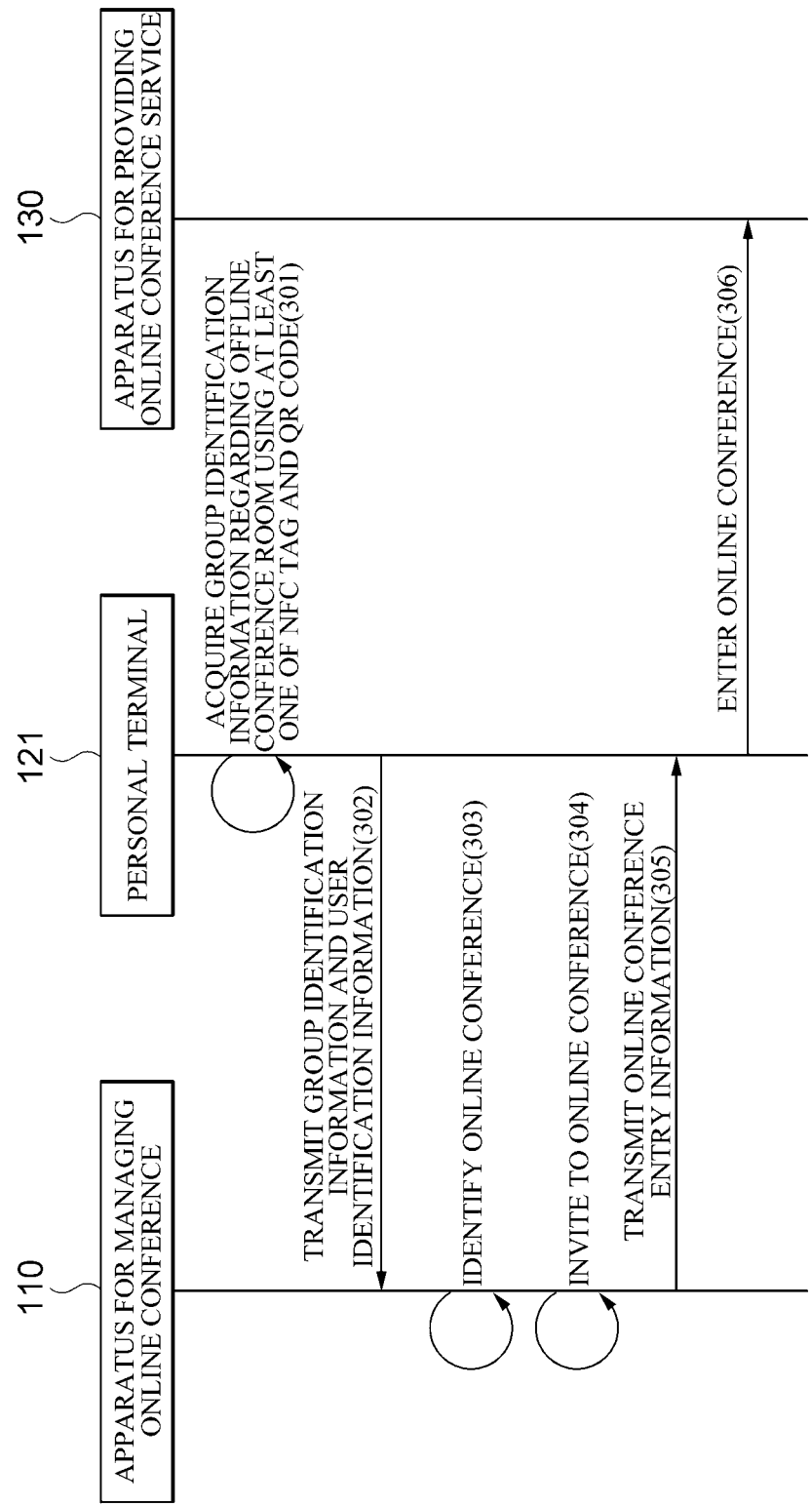
FIG. 3 is a flowchart illustrating an example of managing an online conference when a user terminal is a personal terminal according to an embodiment.

FIG. 3 is a flowchart illustrating an example of managing an online conference when a user terminal is a personal terminal according to an embodiment.

Referring to FIG. 3, a personal terminal 121 acquires group identification information regarding an offline conference room using at least one of an NFC tag and a QR code included in the offline conference room (301).

Thereafter, the personal terminal 121 transmits the group identification information regarding the offline conference room and user identification information stored in the personal terminal 121 to an apparatus 110 for managing an online conference (302).

Then, the apparatus 110 for managing an online conference identifies an online conference connected to the offline conference room based on the received group identification information (303).

Thereafter, when the online conference connected to the offline conference room is identified, the apparatus 110 for managing an online conference invites a user to the identified online conference (304). In this case, the apparatus 110 for managing an online conference may register participant information based on the group identification information and user identification information received from the personal terminal 121.

Thereafter, the apparatus 110 for managing an online conference transmits online conference entry information for attending the identified online conference to the personal terminal 121 (305).

Thereafter, the personal terminal 121 enters the online conference provided by an apparatus 130 for providing an online conference service based on the online conference entry information (306).

Figure 4:
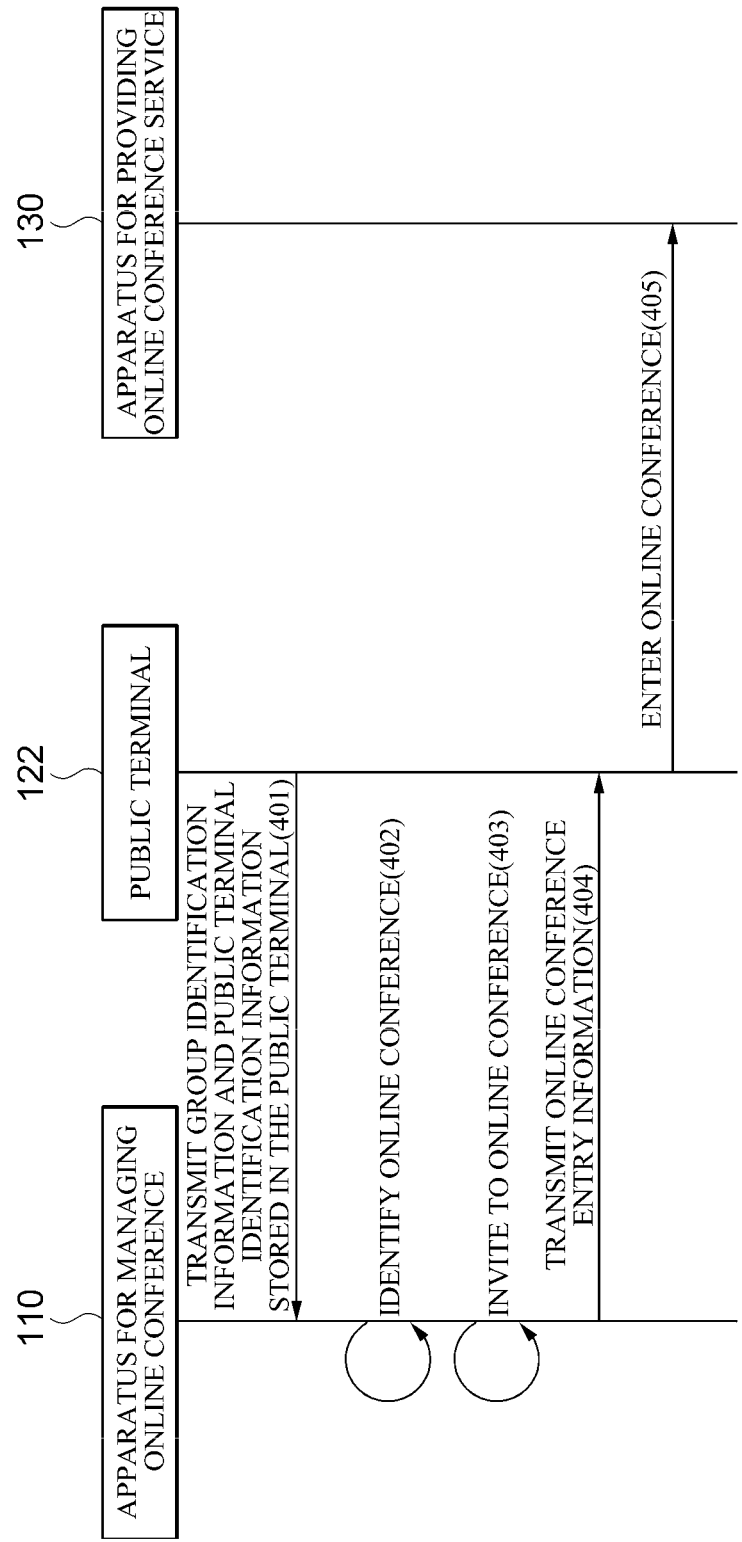
FIG. 4 is a flowchart illustrating an example of managing an online conference when a user terminal is a public terminal according to an embodiment.

FIG. 4 is a flowchart illustrating an example of managing an online conference when a user terminal is a public terminal according to an embodiment.

Referring to FIG. 4, a public terminal 122 transmits group identification information regarding an offline conference room and public terminal identification information, which are stored in the public terminal 122, to an apparatus 110 for managing an online conference (401).

Thereafter, the apparatus for managing an online conference identifies an online conference connected to the offline conference room based on the received group identification information (402).

Then, when the online conference connected to the offline conference room is identified, the apparatus 110 for managing an online conference invites a user to the identified online conference (403). In this case, the apparatus 110 for managing an online conference may register participant information based on the group identification information and public identification information received from the personal terminal 121.

Then, the apparatus 110 for managing an online conference transmits online conference entry information for attending the identified online conference to the public terminal 122 (404).

Thereafter, the public terminal 122 enters the online conference provided by an apparatus 130 for providing an online conference service based on the online conference entry information (405).

Figure 5:
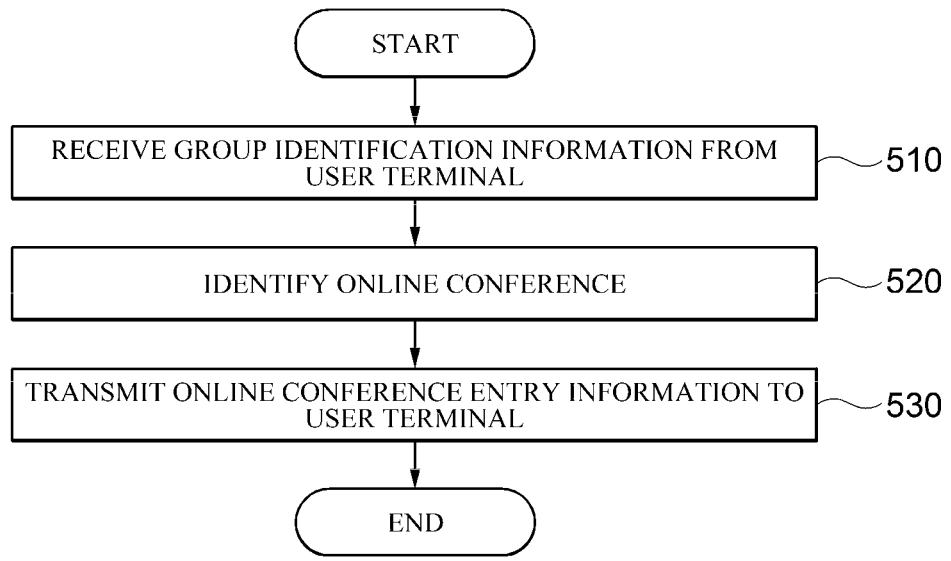
FIG. 5 is a flowchart illustrating a method of managing an online conference according to an embodiment.

FIG. 5 is a flowchart illustrating a method of managing an online conference according to an embodiment.

The method of managing an online conference management shown in FIG. 5 may be performed by, for example, the apparatus 110 for managing an online conference shown in FIG. 2.

Referring to FIG. 5, the apparatus 110 for managing an online conference receives group identification information regarding an offline conference room from a user terminal 120 of a user who intends to attend an online conference in the offline conference room (510).

At this time, when the user terminal 120 is the user's personal terminal, the apparatus 110 for managing an online conference may receive group identification information acquired using at least one of an NFC tag and a QR code included in the offline conference room from the personal terminal.

In contrast, when the user terminal 120 is a public terminal included in the offline conference room, the apparatus 110 for managing an online conference may receive group identification information stored in the public terminal from the public terminal.

Thereafter, the apparatus 110 for managing an online conference identifies an online conference connected to the offline conference room based on the received group identification information (520).

Thereafter, the apparatus 110 for managing an online conference transmits online conference entry information for attending the identified online conference to the user terminal 120 (530).

Figure 6:
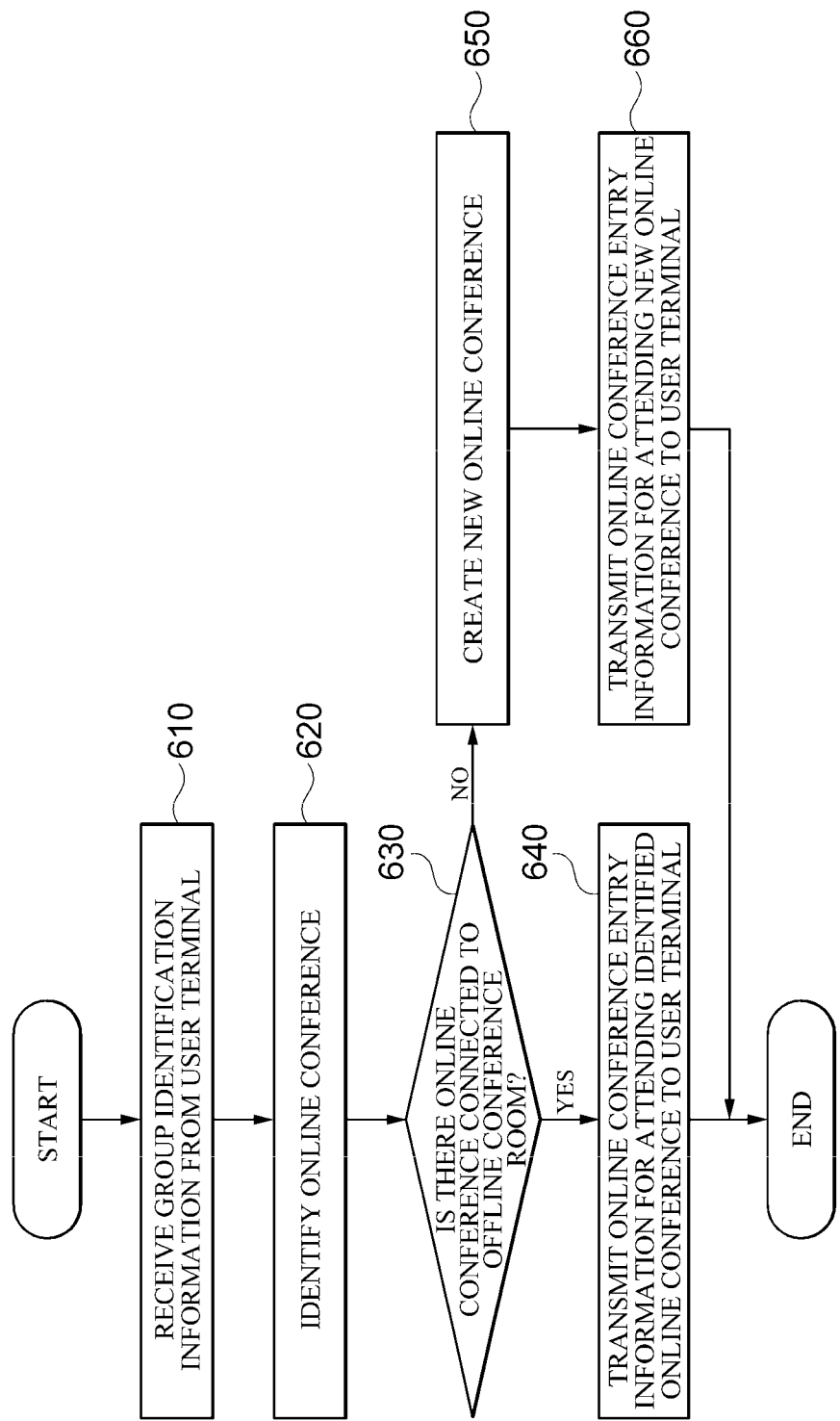
FIG. 6 is a flowchart illustrating a method of managing an online conference according to an additional embodiment.

FIG. 6 is a flowchart illustrating a method of managing an online conference according to an additional embodiment.

The method shown in FIG. 6 may be performed by, for example, the apparatus 110 for managing an online conference shown in FIG. 1.

In the example illustrated in FIG. 6, operations 610 and 620 are substantially the same as operations 510 and 520 illustrated in FIG. 5, and thus redundant descriptions thereof will be omitted.

Referring to FIG. 6, the apparatus 110 for managing an online conference may determine whether there is an online conference connected to an offline conference room according to an identification result in operation 620 (630).

In this case, when it is determined in operation 630 that there is an online conference connected to the offline conference room, the apparatus 110 for managing an online conference may transmit online conference entry information for attending the identified online conference to the user terminal 120 (640).

In contrast, when it is determined in operation 630 that there is no online conference connected to the offline conference room (630), the apparatus 110 for managing an online conference may create a new online conference connected to the offline conference room (650).

Thereafter, the apparatus 110 for managing an online conference may transmit online conference entry information for attending a new online conference to the user terminal 120 (660).

Meanwhile, in the flowcharts shown in FIGS. 5 and 6, at least some of the operations may be performed in different order or may be combined into fewer operations or further divided into more operations. In addition, some of the operations may be omitted, or one or more extra operations, which are not illustrated, may be added to the flowchart and be performed.

Figure 7:
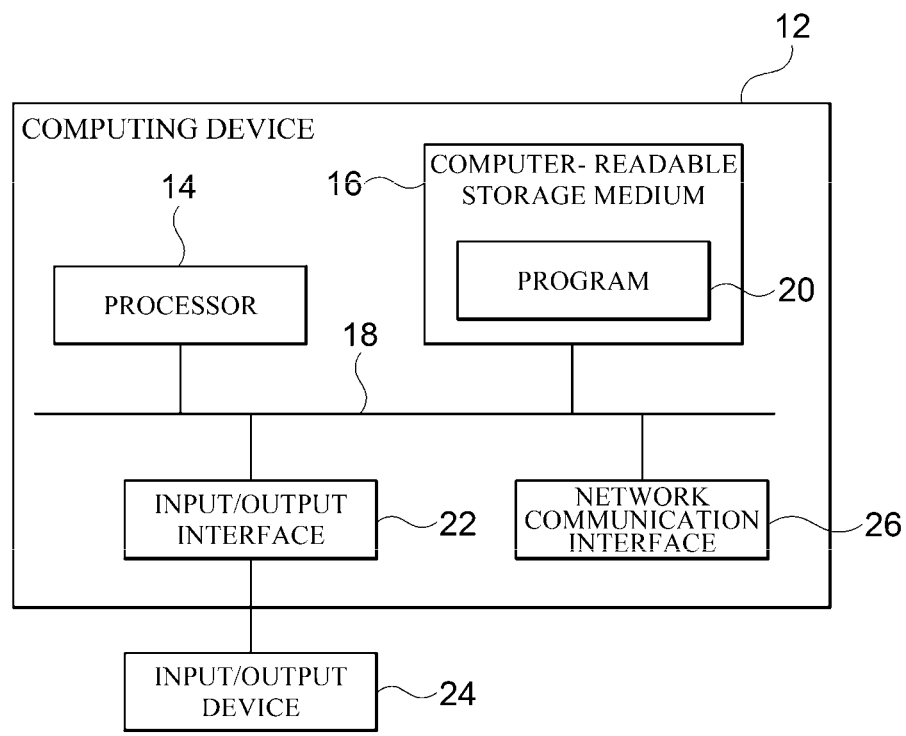
FIG. 7 is a block diagram illustrating an example of a computing environment including a computing device suitable for use in exemplary embodiments.

FIG. 7 is a block diagram illustrating an example of a computing environment including a computing device suitable for use in exemplary embodiments. In the illustrated embodiment, each of the components may have functions and capabilities different from those described hereinafter and additional components may be included in addition to the components described herein.

The illustrated computing environment 10 includes a computing device 12. In one embodiment, the computing device 12 may be one or more components included in, for example, the apparatus 110 for managing an online conference shown in FIG. 2.

The computing device 12 includes at least one processor 14, a computer-readable storage medium 16, and a communication bus 18. The processor 14 may cause the computing device 12 to operate according to the above-described exemplary embodiment. For example, the processor 14 may execute one or more programs stored in the computer-readable storage medium 16. The one or more programs may include one or more computer executable instructions, and the computer executable instructions may be configured to, when executed by the processor 14, cause the computing device 12 to perform operations according to the exemplary embodiment.

The computer-readable storage medium 16 is configured to store computer executable instructions and program codes, program data and/or information in other suitable forms. The programs stored in the computer-readable storage medium 16 may include a set of instructions executable by the processor 14. In one embodiment, the computer-readable storage medium 16 may be a memory (volatile memory, such as random access memory (RAM), non-volatile memory, or a combination thereof) one or more magnetic disk storage devices, optical disk storage devices, flash memory devices, storage media in other forms capable of being accessed by the computing device 12 and storing desired information, or a combination thereof.

The communication bus 18 connects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18.

The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for managing an online conference, comprising:
a group identification information receiver configured to receive an online conference participation request message including a group identification information assigned to an offline conference place from a user terminal of a user who intends to attend an online conference in the offline conference place;
an online conference identifier configured to identify an online conference connected to the offline conference place based on the received group identification information; and
an online conference manager configured to, when the online conference connected to the offline conference place exists, transmit online conference entry information for inviting the user to the identified online conference to the user terminal, after receiving the online conference participation request message,
wherein the online conference manager is further configured to:
manage participant information for each of one or more participants attending the online conference, and
distinguish a type of a specific participant whether the specific participant among the one or more participants is attending the online conference in the offline conference place or in a place other than the offline conference place based on whether the participant information for the specific participant includes the group identification information or not.

2. The apparatus of claim 1, wherein the user terminal comprises at least one of a personal terminal of the user and a public terminal included in the offline conference place.

3. The apparatus of claim 2, wherein the identification information receiver is further configured to, when the user terminal is the public terminal, receive the group identification information stored in the public terminal from the public terminal.

4. The apparatus of claim 1, wherein the online conference entry information comprises at least one of identification information regarding the online conference and an access address for attending the online conference.

5. The apparatus of claim 1, wherein the online conference manager is further configured to, when the online conference connected to the offline conference place does not exist, create a new online conference connected to the offline conference place and transmit online conference entry information for inviting the user to the new online conference to the user terminal.

6. The apparatus of claim 1, wherein the participant information for the specific participant includes at least one of a type of participant for the specific participant, participant identification information for the specific participant and the group identification information.

7. A method of managing an online conference, comprising:
receiving an online conference participation request message including a group identification information assigned to an offline conference place from a user terminal of a user who intends to attend an online conference in the offline conference place;
identifying an online conference connected to the offline conference place based on the received group identification information;
when the online conference connected to the offline conference place exists, transmitting online conference entry information for inviting the user to the identified online conference to the user terminal, after receiving the online conference participation request message;
managing participant information for each of one or more participants attending the online conference; and
distinguishing a type of a specific participant whether the specific participant among the one or more participants is attending the online conference in the offline conference place or in a place other than the offline conference place based on whether the participant information for the specific participant includes the group identification information or not.

8. The method of claim 7, wherein the user terminal comprises at least one of a personal terminal of the user and a public terminal included in the offline conference place.

9. The method of claim 8, wherein the receiving comprises, when the user terminal is the public terminal, receiving the group identification information stored in the public terminal from the public terminal.

10. The method of claim 7, wherein the online conference entry information comprises at least one of identification information regarding the online conference and an access address for attending the online conference.

11. The method of claim 7, further comprising, after the identifying:
   when the online conference connected to the offline conference place does not exist, creating a new online conference connected to the offline conference place; and
   transmitting online conference entry information for inviting the user to the new online conference to the user terminal.

12. The method of claim 7, wherein the participant information for the specific participant includes at least one of a type of participant for the specific participant, participant identification information for the specific participant and the group identification information.

* * * * *